(12) United States Patent
Kolb

(10) Patent No.: US 11,898,638 B2
(45) Date of Patent: Feb. 13, 2024

(54) FLANGE GASKET

(71) Applicant: LGC US ASSET HOLDINGS, LLC, Houston, TX (US)

(72) Inventor: Steven Kristopher Kolb, Humble, TX (US)

(73) Assignee: LGC US ASSET HOLDINGS, LLC, Houston, TX (US)

( * ) Notice: Subject to any disclaimer, the term of this patent is extended or adjusted under 35 U.S.C. 154(b) by 0 days.

(21) Appl. No.: 16/597,330

(22) Filed: Oct. 9, 2019

(65) Prior Publication Data

US 2020/0040998 A1 Feb. 6, 2020

Related U.S. Application Data

(63) Continuation of application No. 15/621,175, filed on Jun. 13, 2017, now abandoned, which is a continuation of application No. 13/795,897, filed on Mar. 12, 2013, now abandoned.

(60) Provisional application No. 61/615,441, filed on Mar. 26, 2012.

(51) Int. Cl.
| | |
|---|---|
| *F16J 15/08* | (2006.01) |
| *F16J 15/12* | (2006.01) |
| *F16L 23/18* | (2006.01) |
| *F16L 23/20* | (2006.01) |

(52) U.S. Cl.
CPC ....... *F16J 15/0806* (2013.01); *F16J 15/0818* (2013.01); *F16L 23/18* (2013.01); *F16L 23/20* (2013.01)

(58) Field of Classification Search
CPC .... F16J 15/0806; F16J 15/1818; F16J 15/122; F16L 23/18; F16L 23/20
USPC .......................... 277/591–598, 608, 644, 650
See application file for complete search history.

(56) References Cited

U.S. PATENT DOCUMENTS

| | | | |
|---|---|---|---|
| 5,421,594 A * | 6/1995 | Becerra | F16J 15/122 277/608 |
| 2003/0011143 A1* | 1/2003 | Shinoda | F16J 15/0881 277/614 |
| 2004/0118510 A1* | 6/2004 | Pollock | F16J 15/122 156/256 |
| 2004/0135322 A1* | 7/2004 | Weisbrodt | F16J 15/127 277/608 |
| 2007/0241516 A1* | 10/2007 | Efremov | F16J 15/0806 277/626 |

FOREIGN PATENT DOCUMENTS

| | | | | |
|---|---|---|---|---|
| FR | 2882103 A1 * | 8/2006 | | F16J 15/0818 |
| JP | 58050361 A * | 3/1983 | | F16J 15/0818 |
| WO | WO-2005100829 A1 * | 10/2005 | | F16J 15/0818 |

* cited by examiner

*Primary Examiner* — Amber R Anderson
*Assistant Examiner* — Stacy N Lawson
(74) *Attorney, Agent, or Firm* — Alexander B. Uber; GRAY REED

(57) ABSTRACT

A corrugated metal gasket for use between two flanges wherein the corrugated metal gasket is produced by a method comprising the steps of providing an annular gasket substrate and machining into that substrate a plurality of substantially uniform and generally concentric corrugations.

16 Claims, 7 Drawing Sheets

FLANGE GASKET

CROSS REFERENCE TO RELATED APPLICATION

This application is a continuation of copending U.S. application Ser. No. 15/621,175 filed on Jun. 13, 2017, which was itself a continuation of U.S. application Ser. No. 13/795,897 filed on Mar. 12, 2013, both of which claim priority to U.S. Provisional Application No. 61/615,441 filed Mar. 26, 2012. All of the foregoing are hereby incorporated by reference.

BACKGROUND OF THE INVENTION

The present invention relates generally to gaskets and, more particularly, to an improved gasket for positioning between facing conduit flanges. These facing flanges are bolted together and some of the bolted joint characteristics are relevant to the type of gasket which is selected. In terms of technological background, one general style of flange gasket is best described as a corrugated metal gasket. One example of such a corrugated metal gasket is disclosed in U.S. Pat. No. 5,421,594, which issued Jun. 6, 1995 to Marine & Petroleum Mfg., Inc. of Houston, Texas Another general style of flange gasket is best described as a kammprofile gasket whose design and construction are covered by standard EN-12560-6.

Continuing with the technological background, a still further general style of flange gasket can be described as a spiral-wound gasket. One example of such a spiral-wound gasket is disclosed in WO 2007/087643 A2 with an international publication date of Aug. 2, 2007. Another example of a type or style of a spiral-wound gasket is disclosed in WO 2009/058738 A2 with an international publication date of May 7, 2009.

Any bolted joint experiences relaxation and load loss after initial tightening and the ability for the gasket to recover and assist in compensating for this load loss is critical. Existing corrugated metal gasket technologies utilize thin metal cores where the corrugated geometry is formed using a compression die or roll forming process. The result is a corrugated core that is thin and has minimal load bearing characteristics. Once compressed between flanges, the core easily deflects with minimal load and the corrugation memory is minimal. Relaxation in the joint correlates directly to gasket stress loss.

A kammprofile gasket, part of the existing technology, is produced from a machined substrate. This technology incorporates small machined grooves on the sealing surfaces which do not allow for any noticeable deflection in the core and therefore do not contribute to compressibility. The ability for this gasket to compensate for flange misalignment and issues with flange face parallelism are essentially nonexistent.

As described, the prior art shows first forming corrugations into a thinner metal core which is suitable for a compression die or roll forming process. Secondly, the prior art shows machining small V-shaped grooves.

BRIEF SUMMARY

The present disclosure is a hybrid gasket which involves a machining step, but machining to create corrugations. Machining the corrugated geometry into a substrate with greater thickness, according to the present disclosure, creates a higher degree of stiffness and allows the gasket to recover more closely to the original corrugated geometry. This new construction thus aids in maintaining critical gasket stress. The ability for the gasket to deflect from a greater thickness to a lesser thickness is compressibility. This compressibility characteristic of the gasket allows the gasket to compensate for misalignment and flange parallelism issues as well as increase the ability to seal imperfect connections. The machined gasket disclosed herein with its corrugated geometry results in a style of gasket which is able to combine certain advantages of both the thin corrugated gasket design as well as the machined serrated gasket design and in so doing, eliminate certain disadvantages of both of these prior art styles.

Following is a brief summary of the advantages and disadvantages of these two prior art styles of gaskets which are described above. Advantages of a corrugated metal gasket include the following:
1. The ability to generate high stresses on point load contact of the corrugations.
2. Moderate recovery (although the actual numbers are not particularly high considering the thin metal substrate).
3. Low rigidity.

Disadvantages of a corrugated metal gasket include the following:
1. Moderate to low load bearing capability which results in the material being prone to cracking and fatigue if not loaded evenly.
2. Low rigidity and therefore difficult to handle.
3. Only applicable to 150 and 300 class flanges.

Since "low rigidity" is listed as being both an advantage and a disadvantage, a further explanation may be helpful. Low rigidity can be an advantage because it allows the gasket to be folded and bent in ways which will allow easier installation when there are space restrictions or obstructions. Low rigidity can be a disadvantage as its more fragile nature can allow over-bending which in turn can damage the graphite (or ptfe) facing.

Advantages of a kammprofile gasket include the following:
1. The ability to generate high stresses on point load contact of the serrations.
2. A high load bearing capability which resists cracking and fatigue.
3. Greater rigidity and therefore easy to handle.
4. Can be applied to any pressure class of flanges.

Disadvantages of a kammprofile gasket include the following:
1. Lack of compressibility.
2. Lack of resiliency and recovery.
3. An inability to compensate for flange alignment and parallelism issues.

Contributing to these various advantages and disadvantages of each style or type of gasket is the method of manufacture. The metal forming method using a compression die or roll forming process is tied to some of the listed advantages and disadvantages of the corrugated metal gasket. Similarly, the method of machining a substrate is tied to some of the listed advantages and disadvantages of the kammprofile gasket. In arriving at the disclosed and claimed embodiments of the present invention, there was an effort to try and design a gasket with a greater number of advantages and fewer disadvantages. As disclosed herein, that effort was successful by replacing in the method of manufacture the use of a metal forming operation (compression die or roll forming) with machining operations. By combining the proven concepts of a kammprofile style of gasket with those of a corrugated metal gasket, as embodied by the gasket disclosed herein, the result is a gasket construction which eliminates some of the disadvantages found in both of these prior art designs while including some of the advantages or benefits of each prior art style. For example, by utilizing a heavier core, similar to the kammprofile gasket style, the gasket disclosed herein provides increased rigidity and improved handling characteristics. There is also a high load bearing capability as well as the ability to be used in all pressure classes. By utilizing an alternating series (sinusoidal) of machined corrugations, the gasket disclosed herein has improved recovery and resilience. Further, there is improved compressibility as well as an ability to adapt to alignment deficiencies which may exist in a flange or flange combination. There is also an ability of the disclosed gasket to generate higher stress point contacts on the machined corrugations.

A corrugated metal gasket for use between two flanges wherein the corrugated metal gasket is produced by a method comprising the steps of first providing an annular gasket substrate followed by machining into that substrate a plurality of substantially uniform and generally concentric corrugations.

DETAILED DESCRIPTION

Figure 1:
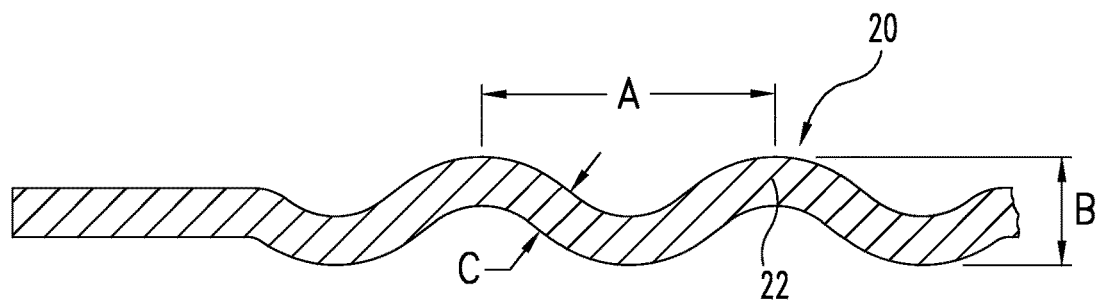
FIG. 1 is a partial, side elevational view, in full section, of a prior art corrugated metal gasket.

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Referring first to FIG. 1, a prior art style of annular flange gasket 20 for use in a bolted flange joint is illustrated in partial, cross-sectional form. The focus of FIG. 1 is on the cross-sectional shape of the corrugations 22 which have a generally sinusoidal shape in a radial direction. The letter "R" reference with arrows are added to FIG. 1 to show the radial direction. This style of gasket is typically referred to as a corrugated metal gasket (CMG). The corrugations 22 are generally concentric with a generally uniform shape and a generally uniform spacing. The relevant dimensional information includes the peak-to-peak pitch (A), the overall height or thickness (B), and the material thickness (C). While these dimensions may vary a little, the most common dimensions which are typical of the majority of prior art constructions set the pitch (A) at approximately 0.125 inches (3.175 mm), the corrugation height or thickness (B) at approximately 0.125 inches (3.175 mm), and the overall material thickness (C) at approximately 0.031 inches (0.787 mm), which is in the range of a 22 gauge material.

Figure 2:
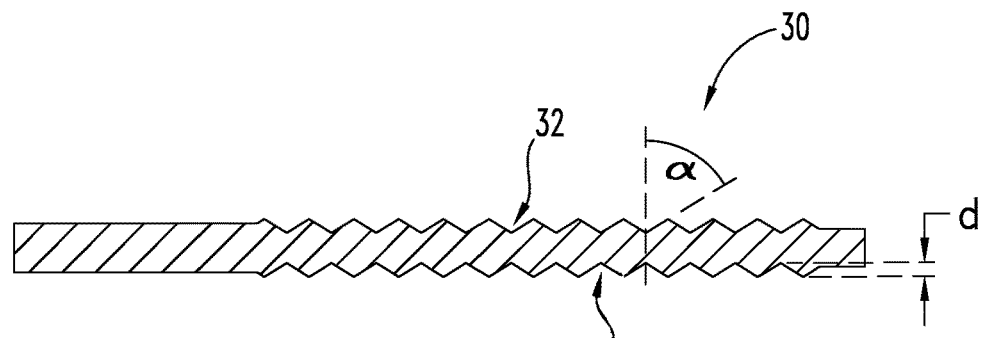
FIG. 2 is a partial, side elevational view, in full section, of a prior art kammprofile gasket.
Figure 2A:
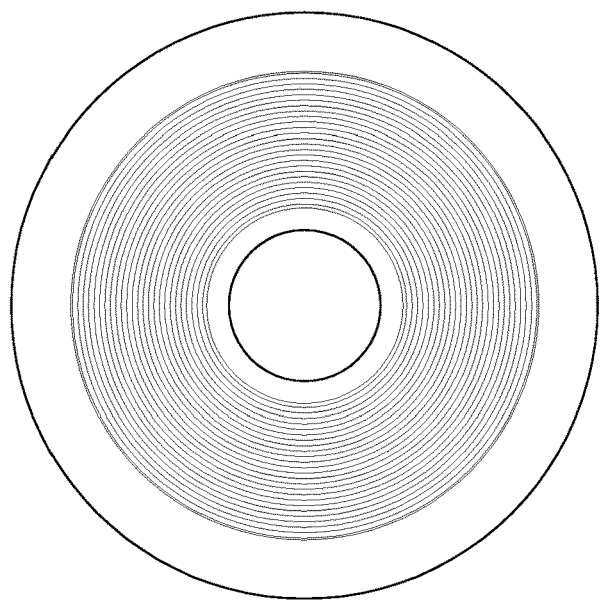
FIG. 2A is a top plan view, in full form, of the FIG. 2 gasket.

Referring next to FIG. 2, a prior art style of annular flange gasket 30 for use in a bolted flange joint is illustrated in partial, cross-sectional form. The focus of FIG. 2 is on the machined grooves 32 and their cross-sectional shape and dimensions. The machined grooves 32 are uniformly sized and shaped and are equally-spaced apart (concentric) into the radial pattern (i.e., concentric sequence) which is also illustrated in the top plan view of FIG. 2A. This style of flange gasket is typically referred to as a "kammprofile" flange gasket. The machined groove depth (d) is typically 0.015 inches (0.381 mm) and the sidewall angles (a) are each typically 45 degrees off of vertical or horizontal. These machined grooves 32 are essentially used to receive and hold a graphite coating. While conceivably machined grooves 32 could be machined into only one facing surface of the core metal (i.e., substrate), it is more common in terms of prior art constructions, and clearly in the vast majority, for the grooves 32 to be machined into both facing surfaces of the core metal in a uniform pattern (see FIG. 2).

According to the present disclosure and consistent with the claimed construction, it has been discovered that it is possible to change the construction or fabrication method for the type and style of the gaskets of FIGS. 1 and 2 and thereby create an improved product by the selected fabrication process, as disclosed herein. Some of the advantages and disadvantages of each of the prior art gasket style of FIGS. 1 and 2 have been identified in the Background portion herein.

Figure 3:
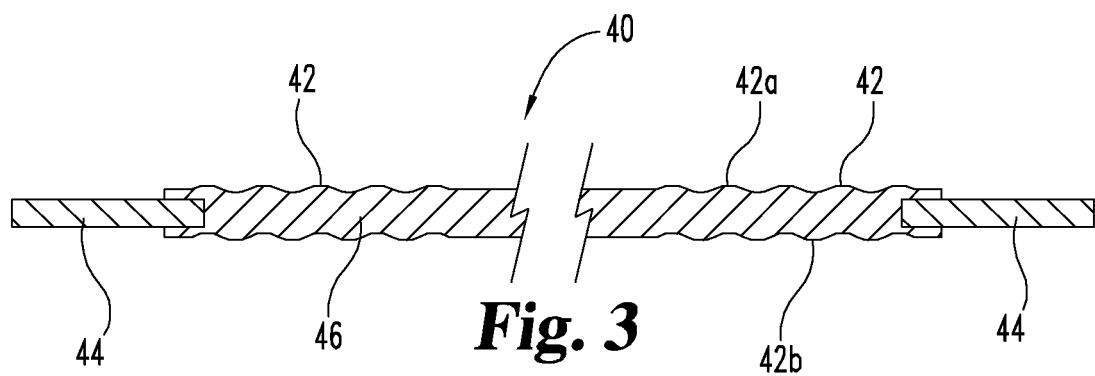
FIG. 3 is a partial, side elevational view, in full section, of a machined, corrugated metal gasket according to this disclosure.
Figure 3A:
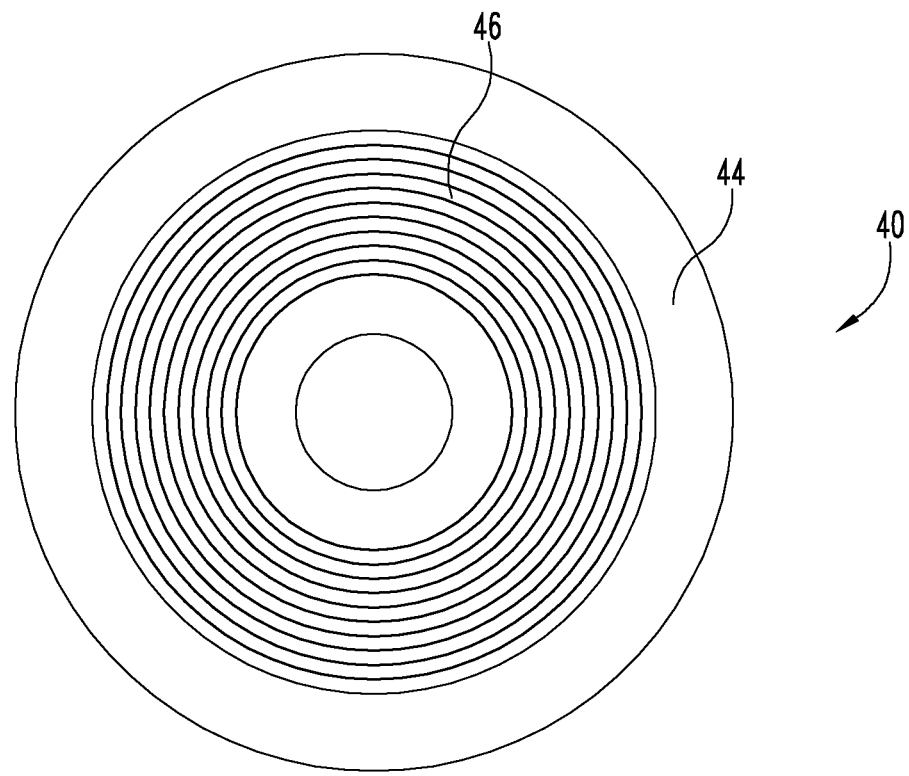
FIG. 3A is a top plan view of the FIG. 3 gasket.
Figure 4A:
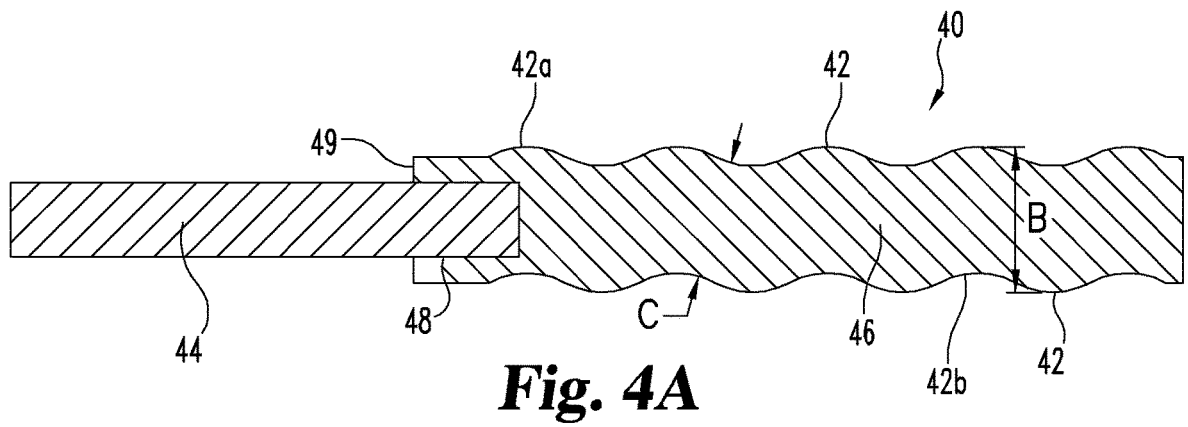
FIG. 4A is an enlarged, partial, side elevational view of the FIG. 3 gasket.
Figure 4B:
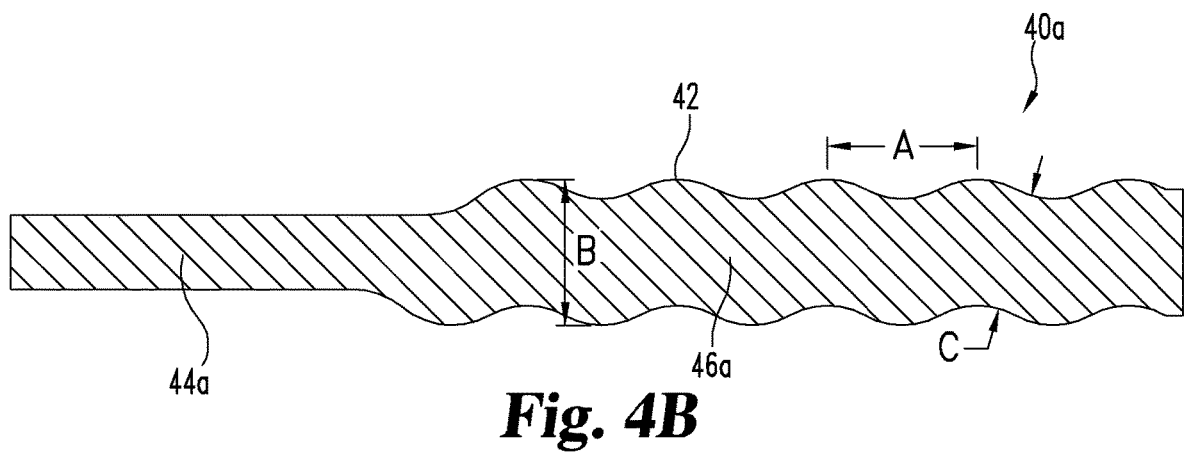
FIG. 4B is an enlarged, partial, side elevational view of an alternative gasket construction.
Figure 4C:
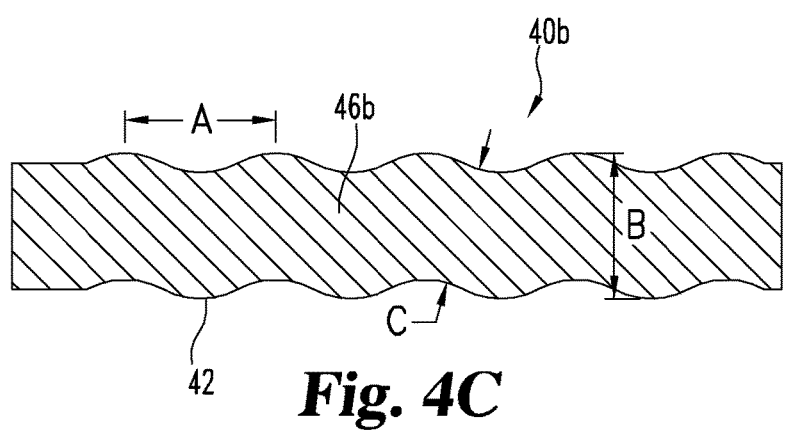
FIG. 4C is an enlarged, partial, side elevational view of an alternative gasket construction.

What has been discovered is that forming or machining a corrugated geometry (i.e., generally sinusoidal shape) into a substrate of greater material thickness (i.e. overall height in an axial direction) by a metal working process creates a unique gasket structure with added advantages and with fewer disadvantages as compared to the two prior art gasket styles disclosed and discussed herein in the context of FIGS. 1 and 2. This new corrugated gasket geometry, according to an exemplary embodiment based on the present disclosure, is illustrated in FIGS. 3, 3A, 4A, 4B and 4C. A partial, cross-sectional view of essentially the entire flange gasket 40 is illustrated in FIG. 3. FIG. 3A provides a top plan view of gasket 40. An enlarged view of the machined corrugations 42 of one embodiment is illustrated in FIG. 4A. The corrugations 42 are formed into the exposed face surfaces 42a and 42b of a thicker annular gasket substrate 46 as compared to the corrugations of FIG. 1 which are formed using a compression die or by a roll forming process. The annular gasket substrate 46 is also referred to herein as the sealing core 46 due in part to its structural relationship with the outer guide ring 44. The rounded corrugations 42 have a uniform, generally sinusoidal shape and repeating pattern which is significantly different from the shallow, 45 degree grooves 32 which are machined into the thicker FIG. 2 substrate for that kammprofile style of gasket.

In the FIG. 4A illustration of gasket 40, the inner portion (i.e., sealing core) 46 of machined corrugations 42 in each opposed face surface is assembled with an optional annular outer guide ring 44. When the disclosed gasket 40 is used with raised face flanges, the outer guide ring 44 which surrounds the outer annular edge of the substrate is used for alignment purposes in the flanges. The outer guide ring 44 is not used with recessed flanges, such as male to female flanges. In this style of flange joint, only the sealing core 46b of the machined corrugations is used, see FIG. 4C. The preferred material for the sealing core 46 is 316 stainless steel.

The outer guide ring 44, when used, is preferably a separate component which is securely joined to the sealing core 46 (see FIG. 4A). An alternative construction is to fabricate (i.e., machine) the outer guide ring 44 as an integral part of the sealing core 46, see FIG. 4B. In this drawing, the integral outer guide ring is item or portion 44a and the sealing core is item or portion 46a. The overall gasket representing this unitary construction is item 40a. In terms of the fabrication, the preferred construction of having two separate components as in FIG. 4A means that an annular groove 48 is machined into and around the outer annular edge face 49 of the sealing core 46. The outer guide ring 44 is installed (i.e., inserted) into this annular groove. These two components can be additionally secured together to avoid separation when the sealing core 46 is manipulated as part of flange assembly.

The machining method for the machined corrugations of the disclosed sealing core begins with the specifying and selection of the appropriate material, based in part on the intended application. An annular ring shape is initially machined from the selected (raw) material stock with an initial size based on the specific application. The machining of this starting material into this starting form uses either a water jet or laser. As another option, a straight strip can be formed into a ring shape and then welded to form a continuous, annular ring. The ring is next mounted on a lathe or CNC machine where the corrugated profile is cut by radial machining. The desired corrugated geometry can be fabricated by means of a milling operation.

The peak-to-peak pitch (A) has a preferred dimension of 0.125 inches (3.175 mm). The overall substrate height or thickness (B), as machined into corrugations 42, has a preferred dimension of 0.125 inches (3.175 mm). The material thickness (C) of the material which is shaped into the series of corrugations has a preferred dimension of 0.125 inches (3.175 mm). The new machined corrugation construction for flange gaskets 40, 40a and 40b (see FIGS. 3, 4A, 4B and 4C), has been discovered to provide certain of the advantages of both the corrugated metal gasket and the kammprofile gasket as described above in the context of FIGS. 1 and 2, without including all of the disadvantages of these two prior art gasket styles. Machining the corrugated geometry into a substrate with greater material thickness, according to the present disclosure, creates a higher degree of stiffness and allows the gasket to recover more closely to the original corrugated geometry. This thus aids in maintaining critical gasket stress. The ability for the gasket to deflect from a greater thickness to a lesser thickness is compressibility. This compressibility characteristic of the gasket allows the gasket to compensate for misalignment and flange parallelism issues as well as increase the ability to seal imperfect connections. The machined gasket disclosed herein with its corrugated geometry results in a style of gasket which is able to combine certain advantages of both the thin corrugated gasket design as well as the machined serrated gasket design and in so doing eliminate certain disadvantages of both of these prior art styles.

Figure 5:
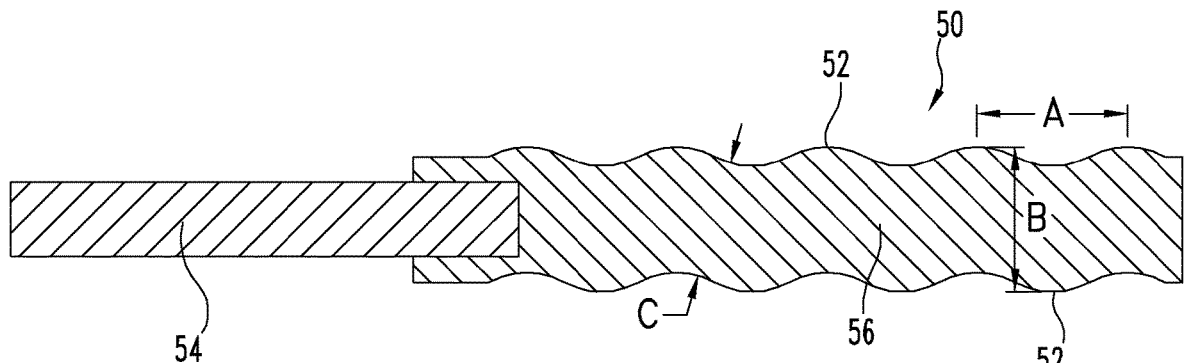
FIG. 5 is an enlarged, partial, side elevational view of the FIG. 3 gasket based on alternative dimensions.
Figure 6:
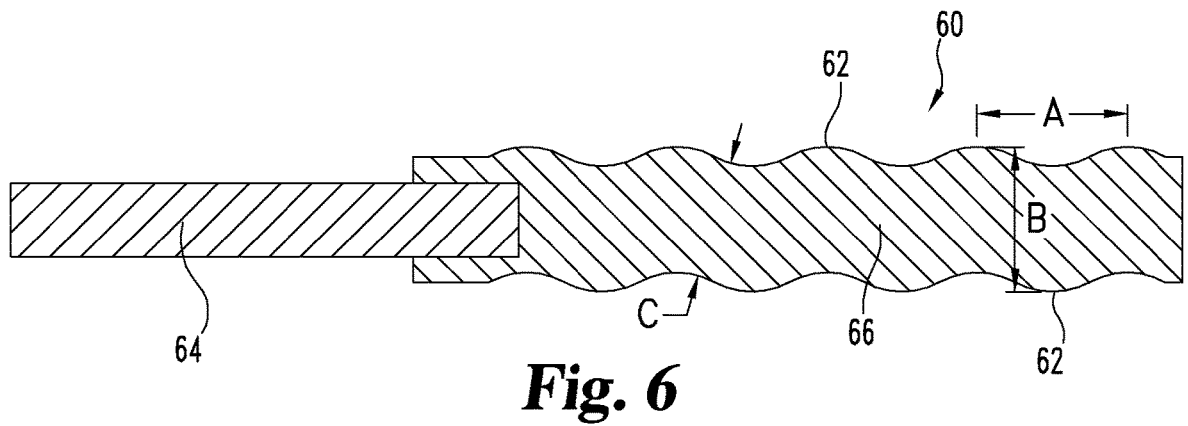
FIG. 6 is an enlarged, partial, side elevational view of the FIG. 3 gasket based on alternative dimensions.
Figure 7:
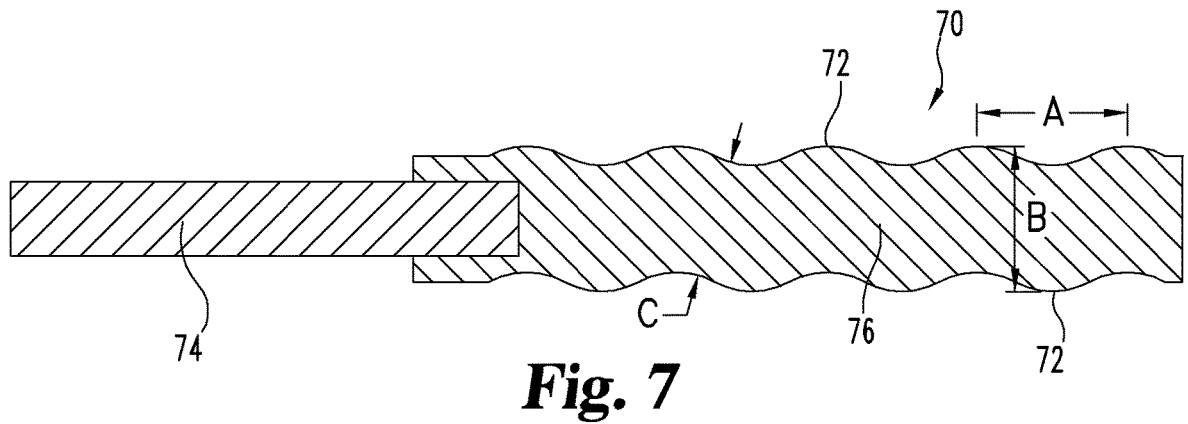
FIG. 7 is an enlarged, partial, side elevational view of the FIG. 3 gasket based on alternative dimensions.

FIGS. 5, 6, and 7 illustrate three alternative embodiments for a flange gasket according to the machined substrate method and the resulting corrugation configurations, as disclosed herein. The materials and dimensions for each flange gasket 50, 60, and 70 are listed below in Table I.

TABLE I

| Gasket Ref. No. | Corrugation Ref. No. | Outer Guide Ring | Sealing Core | A Dimension (inches) | B Dimension (inches) | C Dimension (inches) |
| --- | --- | --- | --- | --- | --- | --- |
| 50 | 52 | 54 | 56 | .125 | .125 | .125 |
| 60 | 62 | 64 | 66 | .250 | .125 | .125 |
| 70 | 72 | 74 | 76 | .125 | .250 | .250 |

Figure 8:
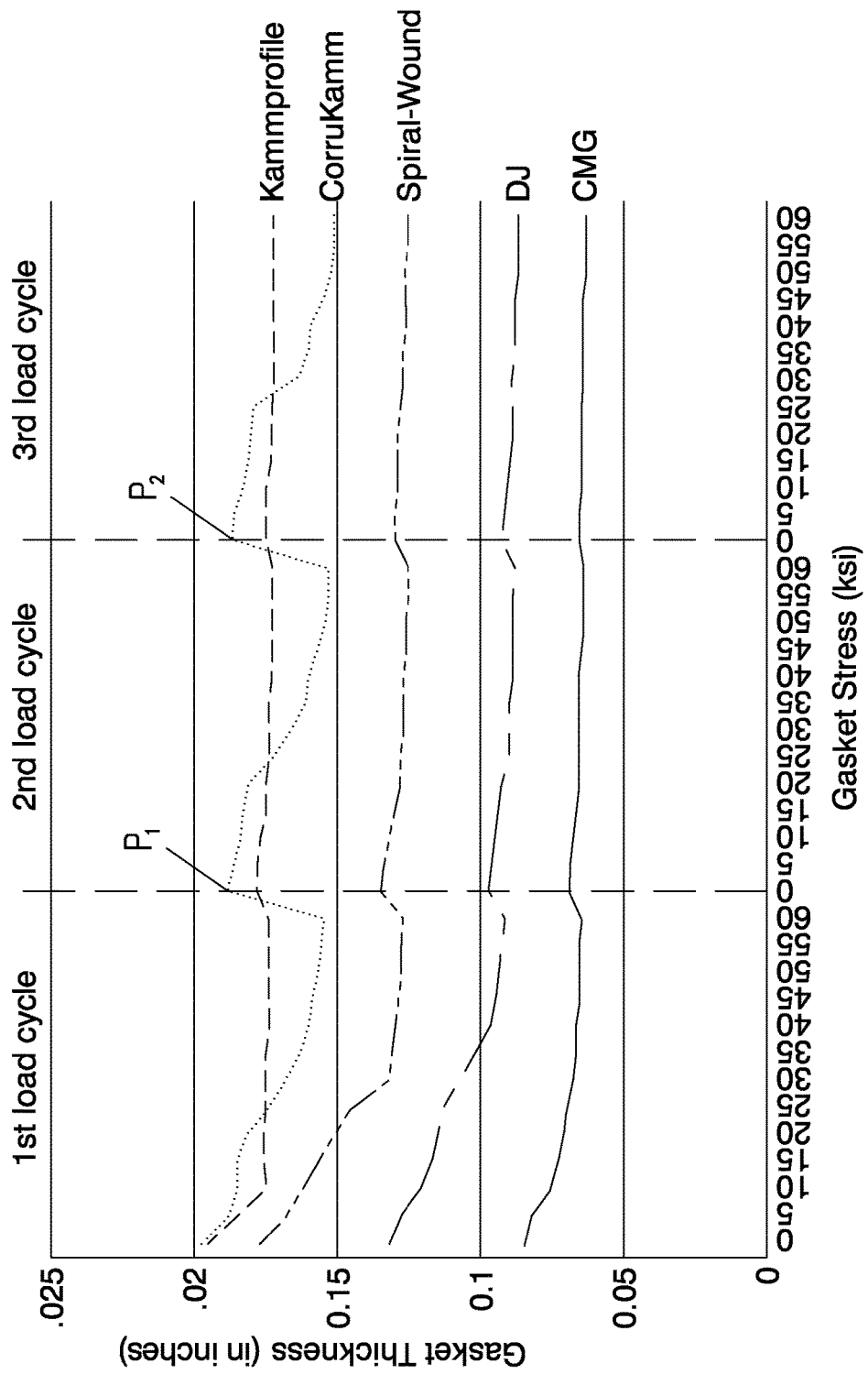
FIG. 8 is a graph showing gasket comparisons with gasket stress and thickness defining the axes.

In evaluating the performance characteristics and properties of flange gasket 40, load versus deflection testing was conducted in order to compare several flange gasket styles. Referring to FIG. 8, a graph showing this gasket comparison is provided. The gasket constructions being compared include a corrugated metal gasket (CMG), a kammprofile gasket, a spiral-wound gasket, a double-jacketed (DJ) gasket, and the "new" gasket according to this disclosure. The "new" gasket is identified as "CorruKamm" which represents having beneficial properties of the two prior art constructions referenced herein. A double-jacketed gasket is one of the common designs used in heat exchanger applications. The new gasket construction disclosed herein is suitable as an improved replacement for a double-jacketed gasket. The X-axis of FIG. 8 represents gasket stress in ksi units. The Y-axis of the FIG. 8 graph represents the thickness of the gasket in inches. The gasket comparison process involved subjecting each gasket style to cyclic loading and unloading in an axial direction, as a way to simulate the compression as the flanges are bolted together. This testing approach is used in an effort to try and simulate a more extreme situation where the gasket loading can fluctuate. At each gasket loading level from 5 ksi to 60 ksi for each load cycle, the gasket compression is maintained for approximately sixty (60) minutes.

The graphic representation for each gasket style illustrates how the gasket can help compensate for these loading fluctuations through physical recovery. The recovery allows the gasket stress to be maintained through the cyclical activity. As illustrated in FIG. 8, there is a clear advantage found with the "new" gasket (CorruKamm) which was constructed for this comparison consistent with the gasket structure disclosed and claimed herein. This "clear advantage" is seen in the form of the extent or degree of gasket thickness recovery points ($P_1$ and $P_2$). These recovery points ($P_1$ and $P_2$) show that the thickness of the CorruKamm gasket returns closer to its starting gasket thickness than any of the other gasket styles represented on the FIG. 8 graph. A related improvement from the new "CorruKamm" gasket is improved sealability. Other relevant parameters with regard to what is illustrated in FIG. 8 include running this gasket comparison at ambient temperature with a 60 ksi bolt stress in a 4 inch (10.16 cm) 150 class flange. Although the referenced testing, reflected by the FIG. 8 results, was conducted at "ambient temperature", it is noted that the actual valves may change at different temperatures. However, the relative numbers for comparison of different gasket styles is expected to be generally the same regardless of the temperature.

Figure 9:
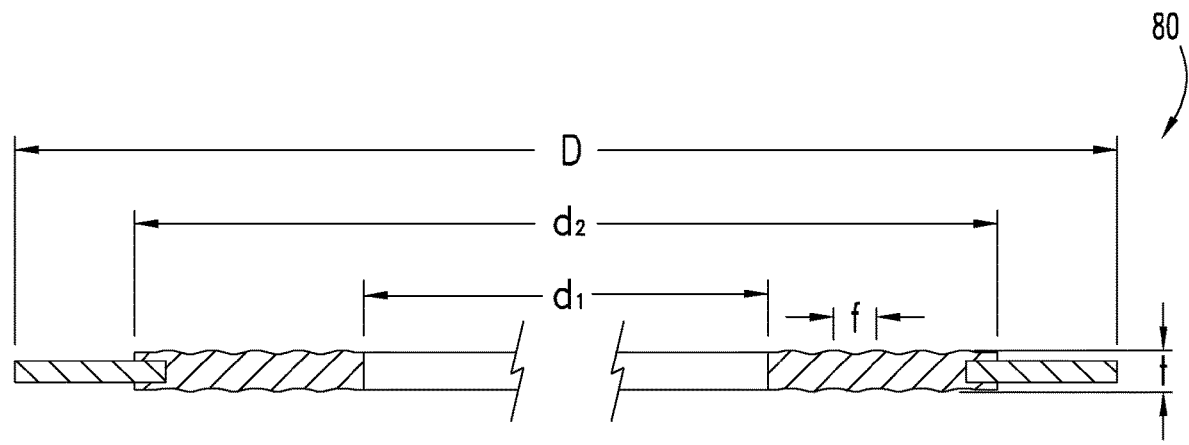
FIG. 9 is a partial, side elevational view, in full section, of a machined, corrugated metal gasket according to this disclosure.
Figure 10:
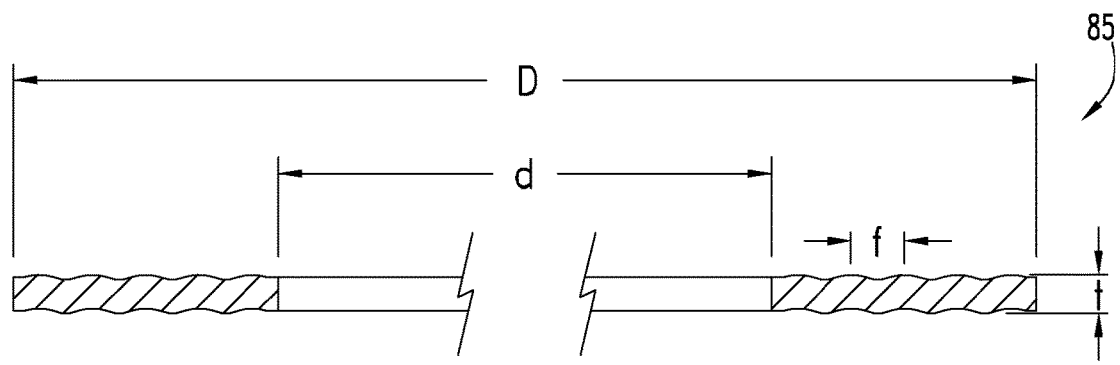
FIG. 10 is a partial, side elevational view, in full section, of a machined, corrugated metal gasket according to this disclosure.
Figure 11:
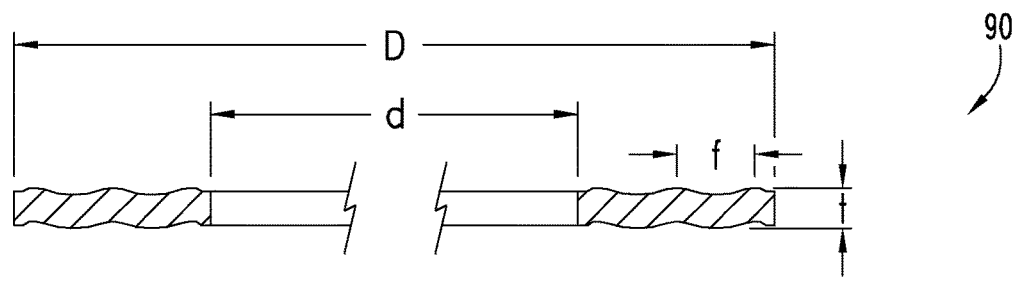
FIG. 11 is a partial, side elevational view, in full section, of a machined, corrugated metal gasket according to this disclosure.

FIGS. 9, 10 and 11 illustrate three embodiments of a flange gasket according to the present disclosure, similar to what has already been described for FIGS. 3-7. These three flange gasket embodiments correspond to the three Corru-Kamm embodiments (C-K80, C-K85 and C-K90) which are represented by the test results of FIG. 12. The FIG. 12 graph, similar to the layout of the FIG. 8 graph, places the gasket thickness (in inches) along the Y-axis and the gasket stress or load (in ksi units) along the X-axis.

With continued reference to FIG. 9, the illustrated flange gasket 80 has an axial thickness (t) of 0.125 inches (3.175 mm) and a pitch frequency (f) for the machine corrugations of 0.125 inches (3.175 mm). The outside diameter dimension (D) is 6.88 inches (17.475 cm). The inside diameter dimension ($d_1$) is 4.87 inches (12.370 cm). The outside diameter dimension ($d_2$) of the corrugation portion is 6.19 inches (15.723 cm). This flange gasket 80 style is denoted in the FIG. 12 graph by the designation label "C-K80" representative of the "CorruKamm" style and the specific embodiment of FIG. 9.

Figure 12:
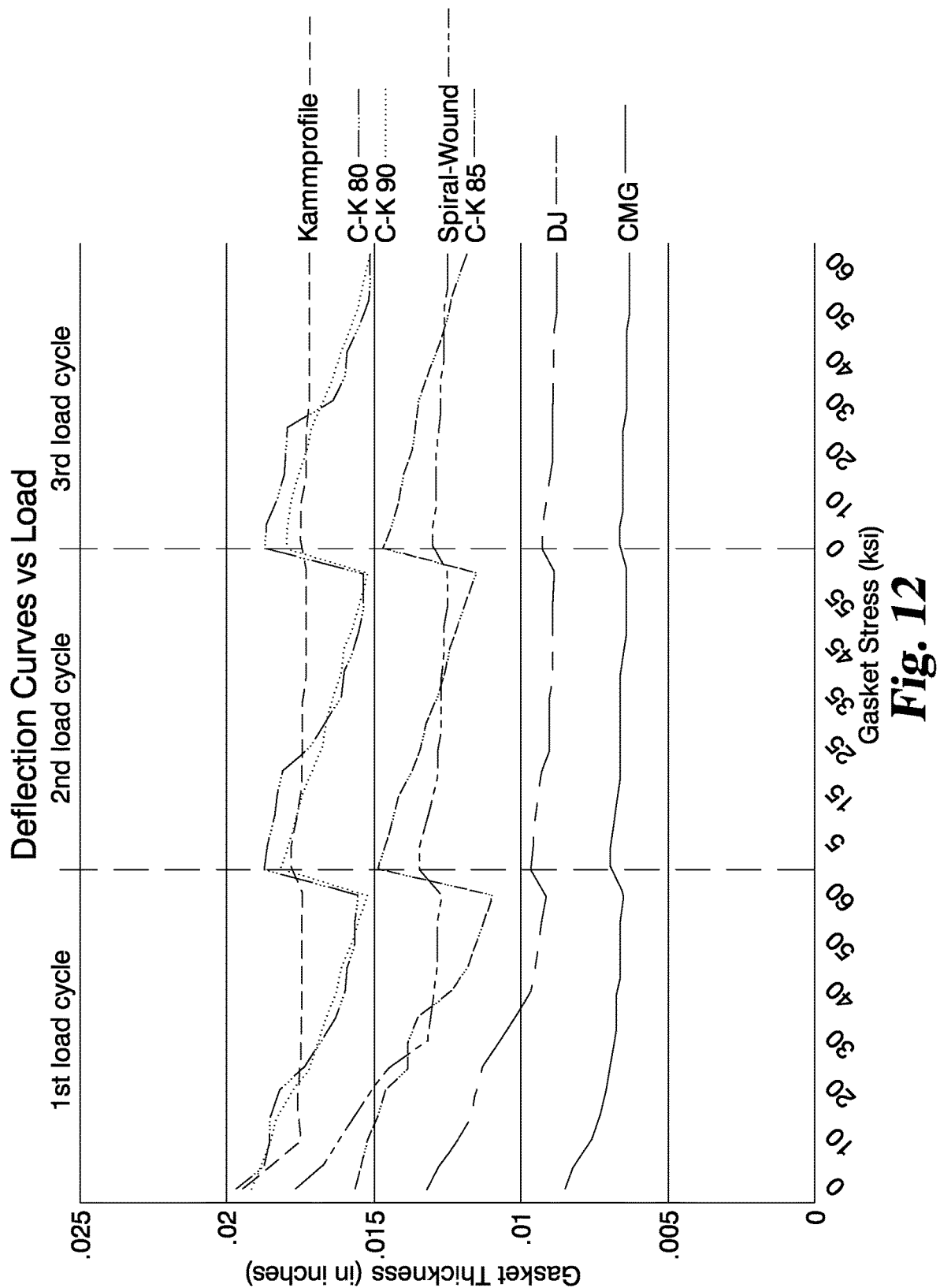
FIG. 12 is a graph showing gasket comparisons with gasket stress and thickness defining the axes.

A further point to note is that the actual gasket thickness (t) of flange gasket 80 in the FIG. 12 graph (C-K80) is approximately 0.197 inches (5.004 mm) based on a starting construction of 0.125 inches (3.175 mm). The increased overall thickness of 0.072 inches (1.829 mm) for the C-K80 gasket as tested is due to the addition of a graphite coating on the starting gasket sizes which are illustrated in each of FIGS. 9, 10 and 11. The FIG. 12 graph includes flange gaskets with a coating while the base constructions of FIGS. 9-11 represent the "as machined" construction, without any coating. The same is true for what is represented by the graph of FIG. 8. The starting thickness is greater than the base core of the flange gasket due to the addition of a coating.

With continued reference to FIG. 10, the outside diameter dimension (D) of flange gasket 85 is 6.12 inches (15.545 cm). The inside diameter dimension (d) is 4.87 inches (12.370 cm). This flange gasket is identified in the FIG. 12 graph by the designation label "C-K85". Flange gasket 85 has a thickness (t) of 0.093 inches (2.362 mm) and a pitch frequency (f) for the machined corrugations of 0.125 inches (3.175 mm).

With continued reference to FIG. 11, the outside diameter dimension (D) of flange gasket 90 is 6.12 inches (15.545 cm). The inside diameter dimension (d) is 4.87 inches (12.370 cm). This flange gasket is identified in the FIG. 12 graph by the designation label "C-K90". Flange gasket 90 has a thickness (t) of 0.125 inches (3.175 mm) and a pitch frequency (f) for the machined corrugations of 0.250 inches (6.350 mm).

The FIG. 12 graph clearly shows that each flange gasket 80, 85 and 90 according to this disclosure exhibits superior properties in terms of recovery through loading cycles. These superior properties exist even when the specifics of the flange gaskets, according to this disclosure, are changed dimensionally, see FIGS. 9, 10 and 11. The actual values of the FIG. 12 graph are presented below in Table II.

TABLE II (all dimensions are in inches)

| Loading cycle | Bolt Stress (ksi) | CMG | Kammprofile | Spiral Wound | DJ | CorruKamm with ⅛" pitch and ⅛" core thickness Flange Gasket 80 (C-K85) | CorruKamm with ⅛" pitch and ³⁄₃₂" core thickness Flange Gasket 85 (C-K80) | CorruKamm with ¼" pitch and ⅛" core thickness Flange Gasket 90 (C-K90) |
|---|---|---|---|---|---|---|---|---|
| 1st | 0 | 0.085 | 0.195 | 0.177 | 0.132 | 0.197 | 0.157 | 0.192 |
|  | 5 | 0.082 | 0.185 | 0.168 | 0.128 | 0.188 | 0.154 | 0.189 |
|  | 10 | 0.076 | 0.175 | 0.162 | 0.121 | 0.185 | 0.152 | 0.185 |
|  | 15 | 0.073 | 0.176 | 0.157 | 0.117 | 0.185 | 0.149 | 0.183 |
|  | 20 | 0.071 | 0.176 | 0.151 | 0.115 | 0.182 | 0.146 | 0.178 |
|  | 25 | 0.07 | 0.175 | 0.145 | 0.113 | 0.174 | 0.138 | 0.172 |
|  | 30 | 0.068 | 0.175 | 0.132 | 0.107 | 0.168 | 0.138 | 0.169 |
|  | 35 | 0.067 | 0.175 | 0.131 | 0.102 | 0.163 | 0.135 | 0.166 |
|  | 40 | 0.067 | 0.174 | 0.13 | 0.097 | 0.16 | 0.124 | 0.163 |
|  | 45 | 0.066 | 0.174 | 0.129 | 0.095 | 0.159 | 0.118 | 0.161 |
|  | 50 | 0.066 | 0.174 | 0.128 | 0.094 | 0.157 | 0.115 | 0.158 |
|  | 55 | 0.066 | 0.174 | 0.128 | 0.093 | 0.156 | 0.112 | 0.155 |
|  | 60 | 0.065 | 0.174 | 0.127 | 0.091 | 0.155 | 0.11 | 0.152 |
| 2nd | 0 | 0.069 | 0.178 | 0.135 | 0.097 | 0.188 | 0.149 | 0.182 |
|  | 5 | 0.069 | 0.178 | 0.134 | 0.096 | 0.186 | 0.146 | 0.179 |
|  | 10 | 0.068 | 0.177 | 0.132 | 0.095 | 0.184 | 0.144 | 0.177 |

TABLE II-continued (all dimensions are in inches)

| Loading cycle | Bolt Stress (ksi) | CMG | Kammprofile | Spiral Wound | DJ | CorruKamm with 1/8" pitch and 1/8" core thickness Flange Gasket 80 (C-K85) | CorruKamm with 1/8" pitch and 3/32" core thickness Flange Gasket 85 (C-K80) | CorruKamm with 1/4" pitch and 1/8" core thickness Flange Gasket 90 (C-K90) |
|---|---|---|---|---|---|---|---|---|
| | 15 | 0.067 | 0.175 | 0.13 | 0.094 | 0.183 | 0.142 | 0.175 |
| | 20 | 0.066 | 0.175 | 0.128 | 0.093 | 0.181 | 0.137 | 0.171 |
| | 25 | 0.066 | 0.174 | 0.128 | 0.09 | 0.172 | 0.134 | 0.168 |
| | 30 | 0.066 | 0.174 | 0.127 | 0.09 | 0.166 | 0.132 | 0.166 |
| | 35 | 0.066 | 0.174 | 0.127 | 0.09 | 0.161 | 0.129 | 0.164 |
| | 40 | 0.066 | 0.173 | 0.127 | 0.089 | 0.16 | 0.126 | 0.161 |
| | 45 | 0.065 | 0.173 | 0.126 | 0.089 | 0.157 | 0.124 | 0.16 |
| | 50 | 0.064 | 0.173 | 0.126 | 0.089 | 0.154 | 0.121 | 0.157 |
| | 55 | 0.064 | 0.173 | 0.125 | 0.089 | 0.153 | 0.118 | 0.154 |
| | 60 | 0.064 | 0.173 | 0.125 | 0.088 | 0.153 | 0.115 | 0.152 |
| 3rd | 0 | 0.066 | 0.175 | 0.13 | 0.093 | 0.187 | 0.147 | 0.18 |
| | 5 | 0.066 | 0.175 | 0.13 | 0.092 | 0.186 | 0.144 | 0.179 |
| | 10 | 0.065 | 0.175 | 0.129 | 0.091 | 0.183 | 0.142 | 0.178 |
| | 15 | 0.065 | 0.173 | 0.129 | 0.09 | 0.181 | 0.14 | 0.176 |
| | 20 | 0.065 | 0.173 | 0.129 | 0.089 | 0.18 | 0.137 | 0.173 |
| | 25 | 0.065 | 0.173 | 0.128 | 0.089 | 0.179 | 0.136 | 0.171 |
| | 30 | 0.064 | 0.172 | 0.127 | 0.089 | 0.164 | 0.135 | 0.167 |
| | 35 | 0.064 | 0.172 | 0.127 | 0.088 | 0.16 | 0.132 | 0.164 |
| | 40 | 0.064 | 0.172 | 0.126 | 0.088 | 0.159 | 0.129 | 0.161 |
| | 45 | 0.064 | 0.172 | 0.126 | 0.088 | 0.155 | 0.126 | 0.158 |
| | 50 | 0.063 | 0.172 | 0.126 | 0.087 | 0.152 | 0.124 | 0.155 |
| | 55 | 0.063 | 0.172 | 0.125 | 0.087 | 0.151 | 0.121 | 0.153 |
| | 60 | 0.063 | 0.172 | 0.125 | 0.087 | 0.151 | 0.118 | 0.151 |

While the preferred embodiment of the invention has been illustrated and described in the drawings and foregoing description, the same is to be considered as illustrative and not restrictive in character, it being understood that all changes and modifications that come within the spirit of the invention are desired to be protected.

I claim:

1. A method of making a corrugated metal gasket for use between flanges, the method comprising:
   providing an annular ring made from a raw stock material comprising a first portion and a second portion;
   machining a first plurality of substantially uniform corrugations into a first axial surface of said second portion of said annular ring; and
   machining a second plurality of substantially uniform corrugations into a second axial surface of said second portion of said annular ring,
   wherein said first portion of said annular ring has a non-compressed axial thickness after said machining of said first plurality of substantially uniform corrugations and said machining of said second plurality of substantially uniform corrugations,
   wherein said first portion is distinct from said second portion and said first portion does not include corrugations,
   wherein a non-compressed distance between a peak of a corrugation of said first plurality of corrugations and a trough of said corrugation of said first plurality of corrugations is less than said non-compressed axial thickness of said first portion,
   wherein said first and/or second plurality of corrugations are the largest corrugations of the annular ring,
   wherein the non-compressed axial thickness of the material of the first portion is less than a distance measurable between parallel lines defined by the troughs of the first and second plurality of substantially uniform corrugations,
   wherein the machining a first plurality of substantially uniform corrugations includes cutting a corrugated profile by radial machining of said first axial surface, and wherein the corrugated profile is subsequently milled to form the desired corrugated geometry.

2. The method according to claim 1 wherein the providing the annular ring includes machining the selected raw stock material to produce an annular ring shape.

3. The method according to claim 2 wherein the machining the raw stock material includes use of a water jet or a laser.

4. The method according to claim 1 wherein the providing the annular ring includes forming an initially straight strip of the selected raw stock material into an annular ring shape by welding opposing ends of the initially straight strip.

5. The method according to claim 1 wherein the raw stock material is selected to have a thickness of 0.250 inches.

6. The method according to claim 1 wherein a pitch between adjacent corrugations in the first axial surface and the second axial surface is at least 0.125 inches.

7. The method according to claim 1 wherein a pitch between adjacent corrugations in the first axial surface and the second axial surface is about 0.250 inches.

8. The method according to claim 1 further comprising providing an outer guide ring to the corrugated metal gasket.

9. The method according to claim 8 wherein providing the outer guide ring includes machining an annular groove into an outer annular edge of the annular ring, said outer annular edge disposed between the first axial surface and the second axial surface, and attaching the outer guide ring into the annular groove.

10. The method according to claim 8 wherein the outer guide ring is unitary and formed from the annular ring.

11. A corrugated metal gasket made according to the method of claim 8.

12. A corrugated metal gasket made according to the method of claim 1.

13. The corrugated metal gasket of claim 12 wherein an outside diameter of the corrugated metal gasket is between 6.12 and 6.88 inches.

14. The corrugated metal gasket of claim 12 wherein an inside diameter of the corrugated metal gasket is 4.87 inches.

15. A method of making a corrugated metal gasket for use between flanges, the method comprising:
providing an annular ring made from a raw stock material comprising a first portion and a second portion;
machining a first plurality of substantially uniform corrugations into a first axial surface of said second portion of said annular ring; and
machining a second plurality of substantially uniform corrugations into a second axial surface of said second portion of said annular ring,
wherein said first portion of said annular ring has a non-compressed axial thickness after said machining of said first plurality of substantially uniform corrugations and said machining of said second plurality of substantially uniform corrugations,
wherein said first portion is distinct from said second portion and said first portion does not include corrugations,
wherein a non-compressed distance between a peak of a corrugation of said first plurality of corrugations and a trough of said corrugation of said first plurality of corrugations is less than said non-compressed axial thickness of said first portion,
wherein said first and/or second plurality of corrugations are the largest corrugations of the annular ring,
wherein the non-compressed axial thickness of the material of the first portion is less than a distance measurable between parallel lines defined by the troughs of the first and second plurality of substantially uniform corrugations,
wherein the machining a first plurality of substantially uniform corrugations includes cutting a corrugated profile by radial machining of said first axial surface,
wherein the corrugated profile is subsequently milled to form the desired corrugated geometry, and
wherein the first axial surface and the second axial surface are coated with graphite.

16. A corrugated metal gasket made according to the method of claim 15.

* * * * *